United States Patent [19]

Yonemoto

[11] Patent Number: 4,677,361
[45] Date of Patent: Jun. 30, 1987

[54] APPARATUS FOR OPERATING AN ELEVATOR

[75] Inventor: Masashi Yonemoto, Nagoya, Japan

[73] Assignee: Mitsubishi Denki Kabushiki Kaisha, Tokyo, Japan

[21] Appl. No.: 741,004

[22] Filed: Jun. 4, 1985

[30] Foreign Application Priority Data

Jun. 7, 1984 [JP] Japan .................. 59-117081

[51] Int. Cl.⁴ .............................................. H02P 5/40
[52] U.S. Cl. ................................. 318/805; 318/803; 318/807; 187/119
[58] Field of Search ............... 308/800, 803, 805–811; 187/29 AC

[56] References Cited

U.S. PATENT DOCUMENTS

| 3,783,358 | 1/1974 | Krauer | 318/201 |
| 3,805,135 | 4/1974 | Blaschke | 318/803 |
| 4,423,367 | 12/1983 | Blaschke et al. | 318/805 |
| 4,431,957 | 2/1984 | Chausse et al. | 318/805 |
| 4,447,787 | 5/1984 | Schwesig et al. | 318/805 |

FOREIGN PATENT DOCUMENTS 54-147416 11/1979 Japan.

Primary Examiner—David Smith, Jr.
Attorney, Agent, or Firm—Leydig, Voit & Mayer

[57] ABSTRACT

A magnetic flux detecting coil for detecting a magnetic flux in the air gap between the stator is provided in the stator and rotor of an induction motor, the actual value of the secondary winding crossing magnetic flux is calculated on the basis of the detected output of the detecting coil, this value is compared with the secondary winding crossing magnetic flux command value to correct the secondary winding resistance value, thereby controlling to correct the slip frequency. Thus, the torque produced by the motor can be stabilized irrespective of the temperature rise of the motor.

6 Claims, 6 Drawing Figures

APPARATUS FOR OPERATING AN ELEVATOR

BACKGROUND OF THE INVENTION

This invention relates to an apparatus for an elevator by controlling an induction motor for hoisting an elevator car by a variable frequency alternating current. More particularly, it relates to an apparatus for operating an elevator by providing a stable performance of the induction drive motor for the elevator even if the circuit constants of the motor vary.

A semiconductor technique has been recently developed, to increase the capacity of a power converter having inverters. Thus, it has been proposed to control an elevator hoisting induction motor by a variable frequency semiconductor power converter. There are various known systems for controlling the induction motor by a power converter, and a system for controlling an induction motor as a D-C motor equivalently in rotary coordinates by resolving the primary winding current into an exciting current component and a torque current component and treating the components as D-C values has been proposed.

An example of this system is shown in FIG. 1. The principle of operation of the control system shown in FIG. 1 will be first described.

A basic equation of an induction motor is represented as the following equation in a coordinate system of an ordinate axis d—an abscissa axis q rotating at the same angular velocity $\omega$ as a secondary winding crossing magnetic flux. In this equation, the phase of the axis d coincides with that of a secondary winding crossing magnetic flux vector.

$$\begin{pmatrix} Vd_1 \\ 0 \\ 0 \\ Vq_1 \end{pmatrix} = \begin{pmatrix} R_1 + PL_1 & PM & -\omega M & -\omega L_1 \\ PM & R_2 + PL_2 & -(\omega - p\omega_r)L_2 & -(\omega - p\omega_r)M \\ (\omega - p\omega_r)M & (\omega - p\omega_r)L_2 & R_1 + PL_2 & PM \\ \omega L_1 & \omega M & PM & R_1 + PL_2 \end{pmatrix} \begin{pmatrix} Id_1 \\ Id_2 \\ Iq_2 \\ Iq_1 \end{pmatrix} \quad (1)$$

In the above equation, $Vd_1$: the component of a primary voltage in axis d
$Vq_1$: the component of a primary voltage in axis q
$Id_1$: the component of a primary current in axis d
$Id_2$: the component of a secondary current in axis d
$Iq_2$: the component of a secondary current in axis q
$Iq_1$: the component of a primary current in axis q
$R_1$: the resistance of a primary winding
$R_2$: the resistance of a secondary winding
$L_1$: self inductance of a primary winding
$L_2$: self inductance of a secondary winding
M: mutual inductance between primary winding and secondary winding
P: differentiating operator (d/dt)
p: the number of paired poles
$\omega_r$: mechanical angular velocity of a rotor
$\omega$: angular velocity of a rotary magnetic field Since the axis d is selected as the axis of the secondary winding magnetic flux, the secondary winding magnetic flux of axis q is zero. Therefore, $$MIq_1 + L_2 iq_2 = 0 \quad (2)$$

From the second line of the equation (1) and the equation (2), $$R_2 Id_2 + P(MId_1 + L_2 Id_2) = R_2 Id_2 + P\Phi_2 = 0 \quad (3)$$

In the equation (3), $$\Phi_2 = MId_1 + L_2 Id_2 \quad (4)$$

where $\Phi_2$ represents the magnetic flux crossing the secondary winding.

From the equations (3) and (4), when the component $Id_2$ of the secondary winding current in the d axis is cancelled, the following equation (5) can be obtained.

$$\frac{\Phi_2}{M} = \frac{1}{1 + P\frac{L_2}{R_2}} Id_1 \quad (5)$$

Then, the following equation (6) can be obtained from the third line of the equation (1) and the equation (2).

$$(\omega - P\omega_r)\Phi_2 - R_2 \frac{M}{L_2} Iq_1 = 0 \quad (6)$$

If there is $\omega_s = \omega - P\omega_r$ (slip angle frequency), $$\omega_s = \frac{R_2 M}{L_2 \Phi_2} Iq_1 \quad (7)$$

The above description is the principle of the control system shown in FIG. 1.

Next the control system in FIG. 1 will be described. In FIG. 1, numeral 1 designates a sinusoidal wave inverter for supplying voltages Vu, Vv and Vw to a hoisting induction motor 2 in accordance with voltage commands Vu*, Vv* and Vw*, respectively, numeral 3 designates a tachometer generator for detecting the rotating angular velocity $\omega_r$ of the motor 2, numerals 4a, 4b, 4c designate current transformers for detecting currents of phases U, V and W of the motor 2 which output detected current values Iu, Iv and Iw, respectively, and numeral 5 designates a coordinate converter for converting the detected 3-phase current values Iu, Iv and Iw into orthogonal biaxial currents $Id_1$, $Iq_1$ which outputs the components $Id_1$ and $Iq_1$ of the primary winding currents in the axes d and q represented by the following equation (8).

$$\begin{pmatrix} Id_1 \\ Iq_1 \end{pmatrix} = \begin{pmatrix} \cos\theta & \sin\theta \\ -\sin\theta & \cos\theta \end{pmatrix} \begin{pmatrix} \frac{\sqrt{2}}{3} & \frac{-1}{\sqrt{6}} & \frac{-1}{\sqrt{6}} \\ 0 & \frac{1}{\sqrt{2}} & \frac{-1}{\sqrt{2}} \end{pmatrix} \begin{pmatrix} Iu \\ Iv \\ Iw \end{pmatrix} \quad (8)$$

In the equation (8), $\cos\theta$ and $\sin\theta$ are output signals of a function generator 11 to be described later, and the components $Id_1$ and $Iq_1$ of the primary winding current in the axes d and q become D-C quantities by this conversion.

Numeral 6 designates a primary delay circuit for simulating the calculation of the equation (5), which comprises a subtractor 6a, a circuit 6b formed of a transfer function 1/s and a circuit 6c formed of a transfer function $R_2/L_2$.

The output of the circuit 6b becomes as follows:

$$\frac{L_2}{R_2} \frac{1}{1 + \frac{L_2}{R_2} P} Id_1$$

This output is equivalent to $L_2\Phi_2/R_2M$ in the equation (5).

Numeral 7 designates a divider which divides the component $Iq_1$ of the output of the converter 5 in the axis q by the output $L_2\Phi_2/R_2M$ of the circuit 6b to calculate the slip angle frequency $\omega_s$ given by the equation (7). Numeral 8 designates a circuit of a transfer function p for converting the mechanical angular velocity $\omega_r$ of the motor 2 into an electric angular velocity $p\omega_r$. Numeral 9 designates an adder for adding the output $\omega_s$ of the divider 7 and the output $p\omega_r$ of the circuit (8) to output a primary current angular frequency $\omega = p\omega_r + \omega_s$, and numeral 10 designates a circuit of a transfer function 1/S for calculating the phase $\theta$ of the primary winding current by integrating the primary winding current angular frequency $\omega$. Numeral 11 designates a function generator which outputs a cosine wave signal $\cos \theta$ and a sinusoidal wave signal $\sin \theta$ on the basis of the phase $\theta$. Numeral 12 designates an exciting current instructing unit for outputting an exciting current command value $\Phi_2^*/M$ corresponding to the secondary winding crossing magnetic flux command value $\Phi_2^*$, numeral 13 designates a subtractor for subtracting the command value $\Phi_2^*/M$ by the output $\Phi_2/M$ of the circuit 6c, numeral 14 designates a circuit of a transfer function $G_1$ for calculating the d-axis primary winding current command value $Id_1^*$ on the basis of a deviation $(\Phi_2^* - \Phi_2)/M$, numeral 15 designates a subtractor for subtracting the d-axis primary winding current command value $Id_1^*$ by the output signal $Id_1$ of the converter 5, numeral 16 designates a circuit of a transfer function $G_2$ for calculating the d-axis primary voltage command value $Vd_1^*$ on the basis of a deviation $(Id_1^* - Id_1)$, numeral 17 designates a speed instructing unit for outputting the running speed command value $\omega_r^*$ of an elevator, numeral 18 designates a subtractor for subtracting the speed command value $\omega_r^*$ by the output signal $\omega_r$ of the generator 3, numeral 19 designates a circuit of a transfer function $G_3$ for calculating the q-axis primary winding current command value $Iq_1^*$ on the basis of a deviation $(\omega_r^* - \omega_r)$, numeral 20 designates a subtractor for subtracting the q-axis primary winding current command value $Iq_1^*$ by the output signal $Iq_1$ of the converter 5, numeral 21 designates a circuit of a transfer function $G_4$ for calculating the q-axis primary winding voltage command value $Vq_1^*$ on the basis of a deviation $(Iq_1^* - Iq_1)$, and numeral 22 designates a coordinate converter which converts orthogonal biaxial voltages $Vd_1^*$, $Vq_1^*$ into 3-phase A-C voltage command values $Vu^*$, $Vv^*$, $Vw^*$, respectively by the following equation (9).

$$\begin{pmatrix} Vu^* \\ Vv^* \\ Vw^* \end{pmatrix} = \begin{pmatrix} \frac{\sqrt{2}}{3} & 0 \\ \frac{-1}{\sqrt{6}} & \frac{1}{\sqrt{2}} \\ \frac{-1}{\sqrt{6}} & \frac{-1}{\sqrt{2}} \end{pmatrix} \begin{pmatrix} \cos \theta & -\sin \theta \\ \sin \theta & \cos \theta \end{pmatrix} \begin{pmatrix} Vd_1^* \\ Vq_1^* \end{pmatrix} \quad (9)$$

Numeral 23 designates a sheave coupled directly with the motor 2, numeral 24 designates a deflecting sheave, numeral 25 designates a rope, numeral 26 designates an elevator car, and numeral 27 designates a counterweight.

The torque generated by the motor 2 is represented as follows by the secondary crossing magnetic flux $\Phi_2$ and the q-axis secondary winding current $iq_2$.

$$T = -p\Phi_2 iq_2 \quad (10)$$

The equation (10) can be modified as the following equation (11) by the equations (2) and (7).

$$T = \frac{P}{R_2} \Phi_2^2 \omega_s \quad (11)$$

As apparent from the equation (11), the torque T generated by the motor 2 becomes a function of the resistance value $R_2$ of the secondary winding, the resistance value $R_2$ depends upon the temperature, and when the motor 2 is operated with a load for a long period of time, the temperature of the secondary winding rises, thereby causing the resistance value $R_2$ to increase. Therefore, when the resistance value $R_2$ used for the calculation of the circuit 6c is assumed to be constant and the motor 2 is controlled accordingly, since the actual value of the resistance $R_2$ varies due to the temperature rise, errors in the calculating equations described above increase, and the smooth rise of the elevator car cannot be obtained.

SUMMARY OF THE INVENTION

It is an object of the present invention to provide an apparatus for controlling the drive motor of an elevator to eliminate the above-described drawbacks and provide a stable controlling characteristics by correcting for any change in resistance value $R_2$ of a secondary winding due to changes in temperature of the motor.

These and other objects of the present invention will become clear upon reading the following description and studying the accompanying drawings.

DESCRIPTION OF THE PREFERRED EMBODIMENTS

An embodiment of the present invention will be described by referring to FIGS. 2 to 5.

Figure 2:
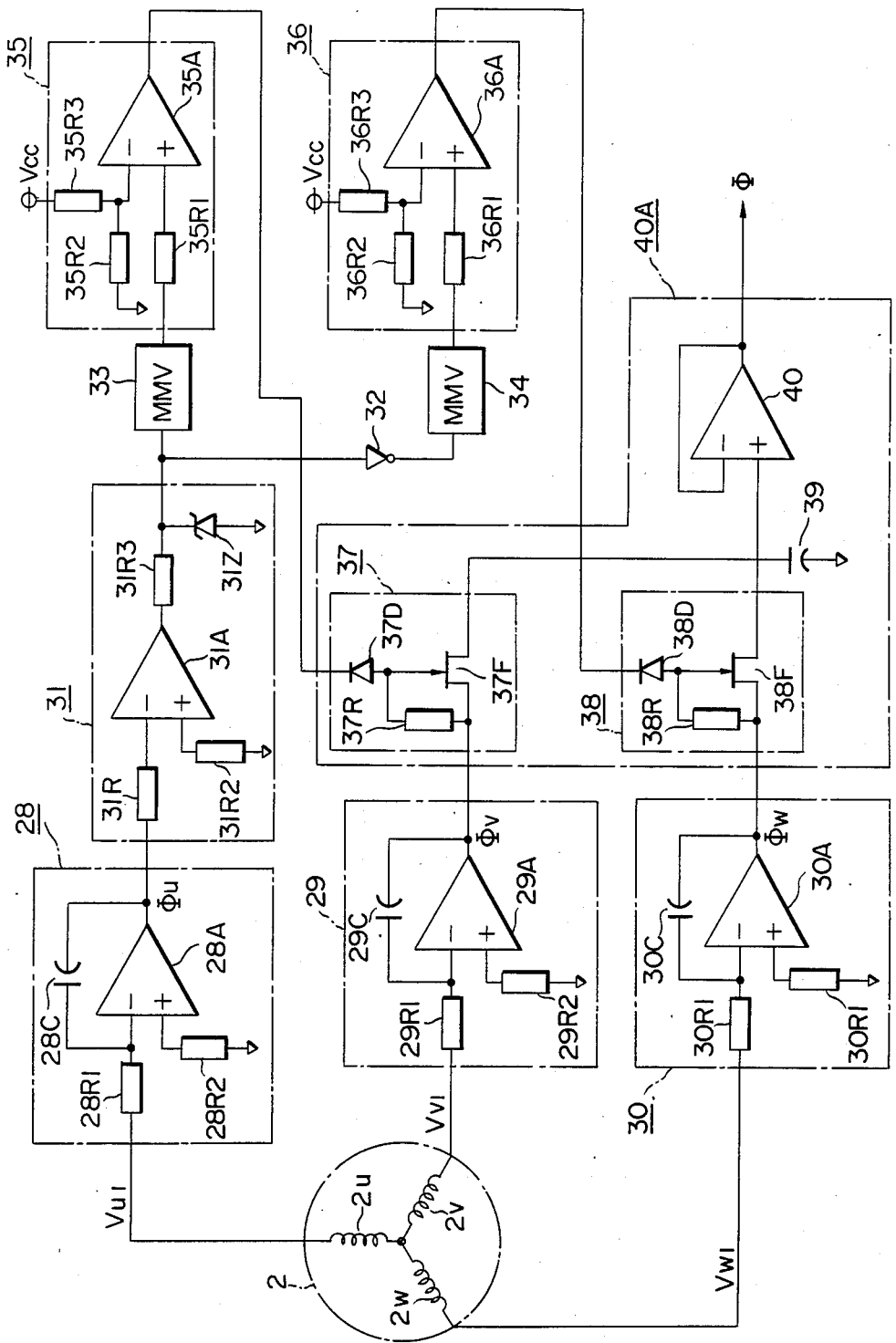
FIG. 2 is a circuit diagram of an electric circuit for detecting the magnetic flux of an induction motor.
Figure 3:
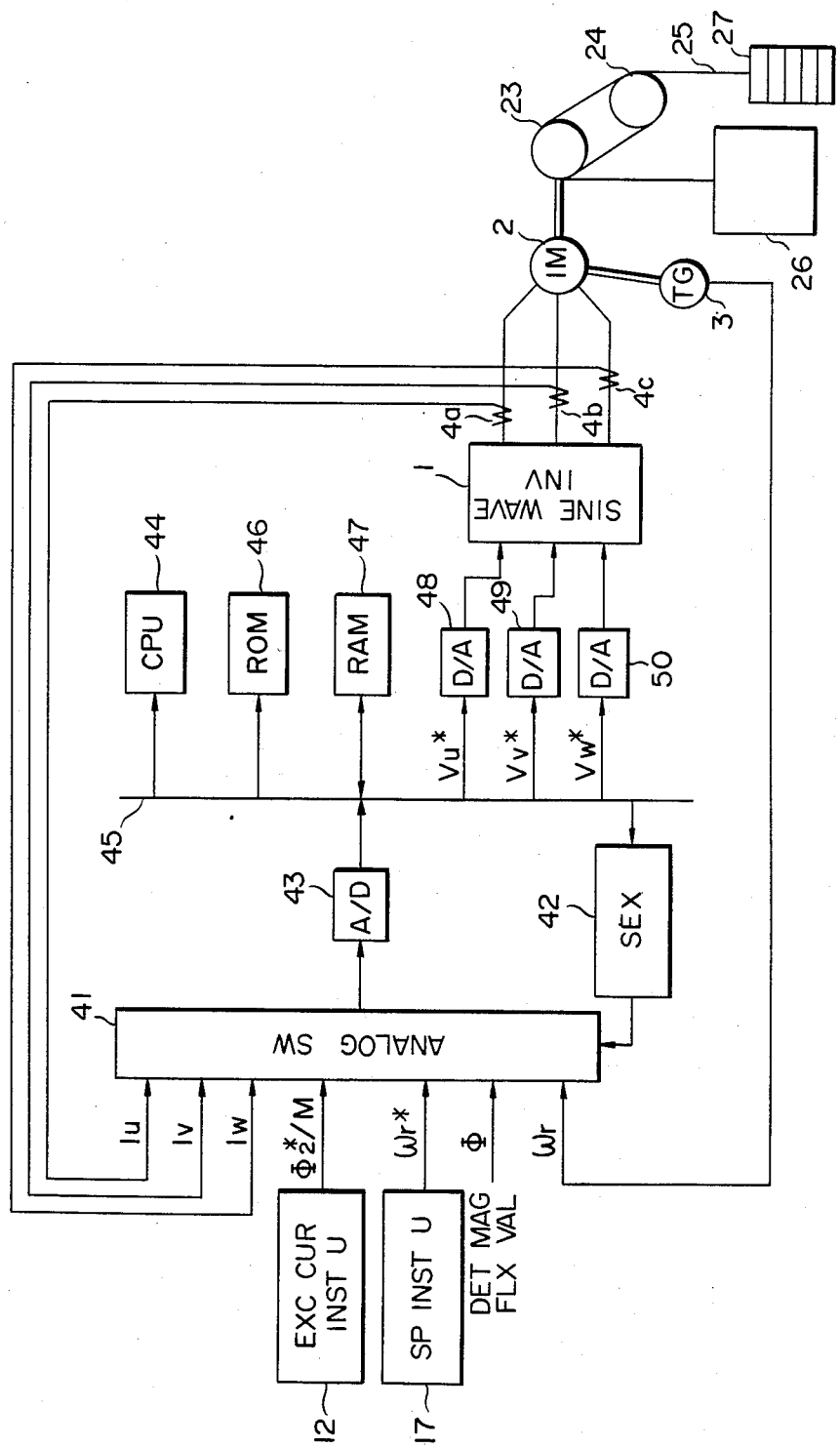
FIG. 3 is a block circuit diagram of the entire apparatus.

In FIGS. 2 and 3, characters 2u, 2v, 2w designate magnetic flux detecting coils provided in a stator of an induction motor 2, numerals 28 to 30 designate integrators, which are respectively composed of capacitors 28C to 30C, and resistors 28R1, 28R2, 29R1, 29R2, 20R1, 20R2. Numeral 31 designates a comparator which has an operational amplifier 31A, resistors 31R1 to 31R3, and a Zener diode 31Z. Numeral 32 designates an inverter gate, numerals 33 and 34 designate monostable multivibrators, and numeral 35 and 36 designate level converters, which are respectively composed of operational amplifiers 35A, 36A, and resistors 35R1 to 35R3, 36R1 to 36R3. Numerals 37 and 38 designate analog switches which are respectively composed of diodes 37D, 38D, resistors 37R, 38R, and FET 37F, 38F, numeral 39 designates a capacitor, numeral 40 designates an operational amplifier which forms a voltage follower. The switches 37, 38, the capacitor 39 and the voltage follower 40 construct a sample-holding circuit 40A. Numeral 41 designates an analog switch, numeral 42 designates a selector for selecting an input signal of the analog switch 41, numeral 43 designates an A/D converter for converting an analog signal into a digital signal, numeral 44 designates a central processing unit (hereinafter referred to as "a CPU"), numeral 45 designates a bus for addresses and data, numeral 46 designates a read-only memory (hereinafter referred to as "a ROM") for storing a program as shown in FIG. 4, numeral 47 designates a random access memory (hereinafter referred to as "a RAM") for temporarily storing data or calculated results, numerals 48 to 50 designate a D/A converter for converting a digital signal into an analog signal, and character Vcc designates a positive power source.

The operation of the apparatus for controlling the drive motor for the elevator will be described herebelow.

Figure 1:
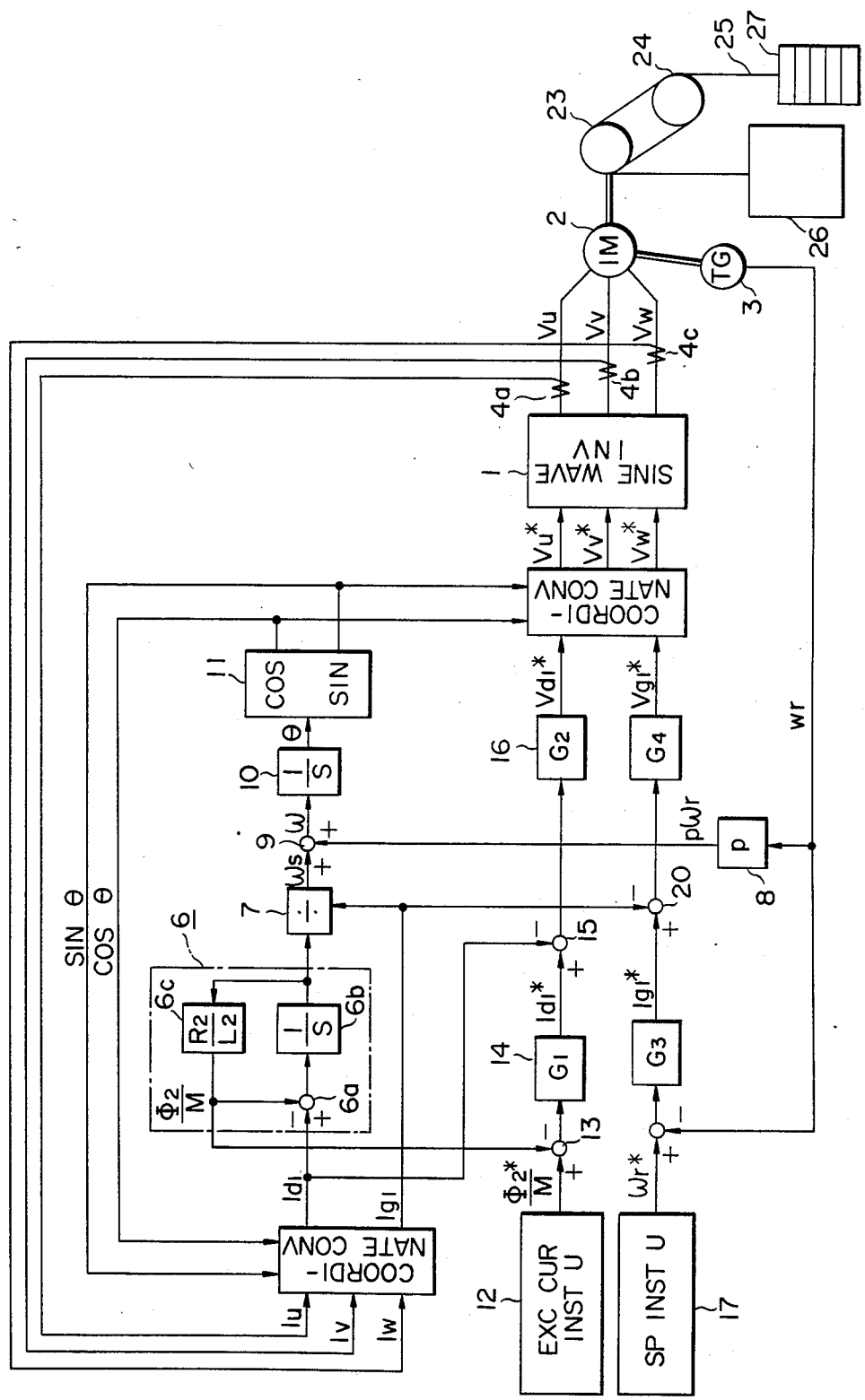
FIG. 1 is a conventional apparatus for controlling an elevator.

The speed command value $\omega_r^*$, the rotating angular velocity $\omega_4$ of the motor 2, the detected current values Iu, Iv, Iw and the output $\Phi$ of the amplifier 40 are sequentially selected by the analog switch 41, and fed to the converter 43. The analog signal is converted by the converter 43 into a digital signal, which is in turn inputted to the CPU 44. The CPU 44 executes a program comprising the functions of the blocks 8, 10, 14, 16, 19, 21, the adder 9, the subtractors 13, 15, 18, 20, the divider 7, the primary delay circuit 8, the coordinate converters 5, 22, the function generator 11 and the exciting current command 12 shown in FIG. 1 and outputs 3-phase A-C voltage commands Vu*, Vv*, Vw*.

Figure 4A:
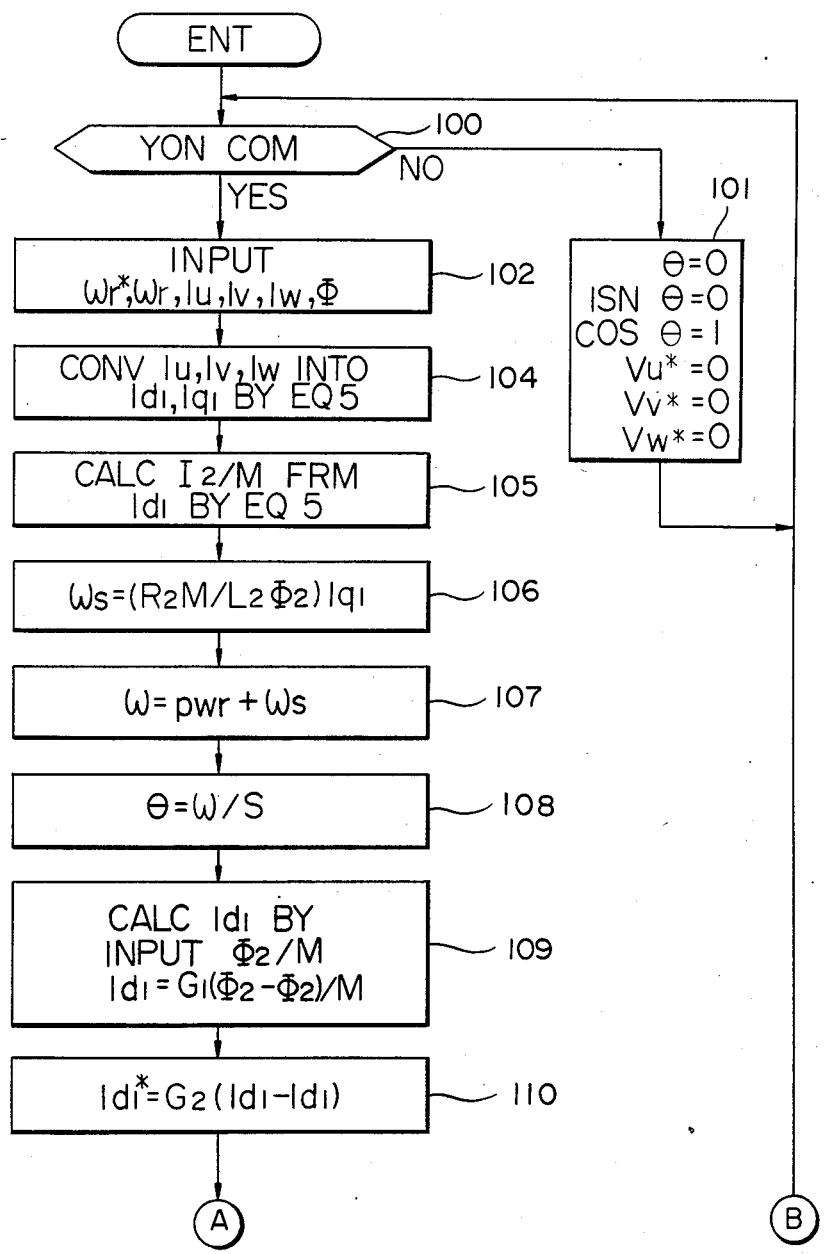
FIGS. 4(a) and 4(b) are flow charts of a program.
Figure 4:
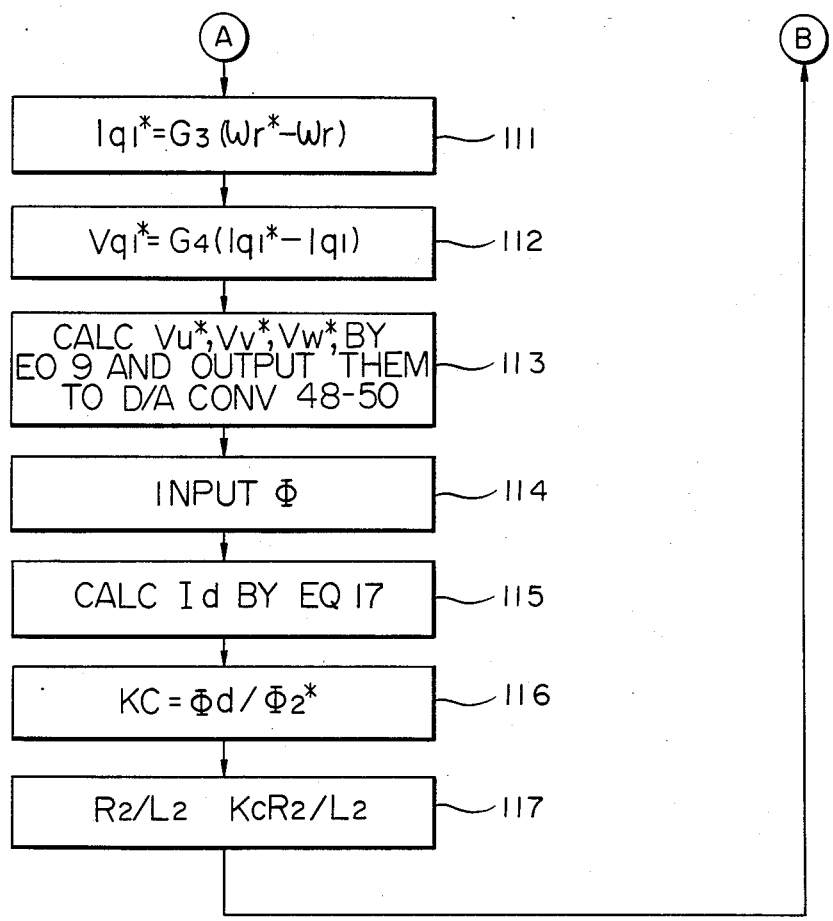
Figure 5:
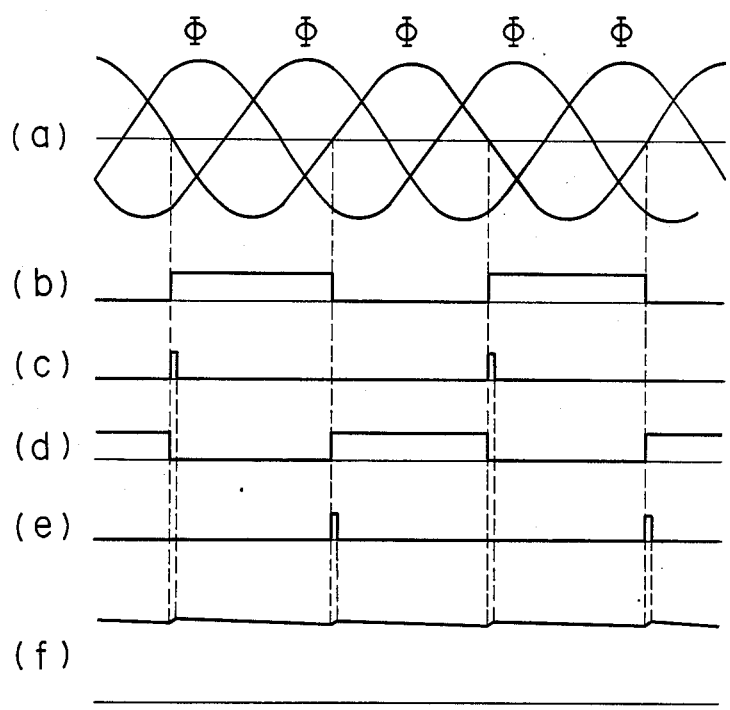
FIG. 5 is an explanatory view showing a signal at a predetermined position of the circuit diagram of FIG. 2.

More particularly, referring to FIGS. 4(a) and 4(b), if a run command (which is outputted from a control board of the elevator and which is not shown) is not delivered in step 100, the operation is shifted to step 101. In the step 101, the 3-phase A-C voltage command values Vu*, Vv*, Vw* are all set to zero. When the run command is delivered, the operation is shifted to step 102. In the step 102, the selector 42 is operated to input the speed command value $\omega_r^*$, the rotating angular velocity $\omega_r$, the detected 3-phase A-C current values Iu, Iv, Iw and the detected magnetic value $\Phi$ through the switch 41 and the converter 43. In step 104, the 3-phase A-C currents Iu, Iv, Iw are converted into orthogonal biaxial currents Id$_1$, Iq$_1$ by the equation (8). In Step 105, the value $\Phi_2/M$ can be obtained by the equation (5) from the secondary current d-axis component Id$_1$. The secondary winding resistance R$_2$, the secondary winding self-inductance L$_2$ and the number p of the paired poles are stored in the ROM 46, and the slip angle velocity $\omega_s$, the angular velocity $\omega$ and the phase $\theta$ of the rotary magnetic field are calculated by these values in steps 106 to 108. In step 109, the exciting current command value $\Phi_2^*/M$ is read out, and the d-axis primary current command value Id$_1^*$ is calculated. In step 110, the d-axis primary voltage command value Vd$_1^*$ is calculated, In step 111, the q-axis primary current command value Iq$_1^*$ is calculated, and the q-axis primary voltage command value Vq$_1^*$ is calculated by using the result in step 112. In step 113, the 3-phase A-C voltage command values Vu*, Vv*, Vw* are calculated by the equation (9), and outputted through the converters 48 to 50. These voltage command values Vu*, Vv*, Vw* are respectively converted into analog values by the converters 48 to 50, and outputted to the inverter 1.

Then, when the inverter 1 operates to supply the 3-phase A-C voltages Vu, Vv, Vw to the motor 2, rotating magnetic fluxes are generated in the motor. Voltages Vu$_1$, Vv$_1$, Vw$_1$ are respectively induced in the magnetic flux detecting coils 2u, 2v, 2w by means of the rotating magnetic fluxes in the stator. The magnetic fluxes $\Phi$u, $\Phi$v, $\Phi$w of the phases are respectively detected by integrating the voltages by the integrators 28 to 30. The calculation is based on the following equations:

$$\left. \begin{array}{l} \Phi u = -\int Vu_1 dt = -\int Vm \sin\omega t \, dt = \dfrac{Vm}{\omega} \sin\left(\omega t + \dfrac{\pi}{2}\right) \\[2mm] \Phi v = -\int Vv_1 dt = \dfrac{Vm}{\omega} \sin\left(\omega t - \dfrac{2}{3}\pi\right) + \dfrac{\pi}{2} \\[2mm] \Phi v = -\int Vw_1 dt = \dfrac{Vm}{\omega} \sin(\omega t - -\pi) + \dfrac{\pi}{2} \end{array} \right\} \quad (12)$$

FIG. 5(a) shows the waveforms of the magnetic fluxes $\Phi$u, $\Phi$v, $\Phi$w of the respective phases. The output of the comparator 31 becomes a high level (hereinafter referred to as "H") when the magnetic flux $\Phi$u becomes negative and outputs a rectangular waveform as shown in FIG. 5(b). The multivibrator 33 outputs a pulse having a narrow width which becomes "H" for a predetermined time when the rectangular wave rises as shown in FIG. 5(c). On the other hand, the rectangular wave is inverted by the inverter gate 32 to produce the waveform of FIG. 5(d). Similarly, the multivibrator 34 outputs the waveform of FIG. 5(e). The levels of the outputs of the multivibrators 33, 34 are respectively converted by the converters 35, 36, the outputs of which are connected to the sample-holding circuit 40A. When the output of the multivibrator 33 becomes "H", the switch 37 is conductive, and the value of the magnetic flux $\Phi$v is stored in the capacitor 39. When the output of the multivibrator 34 becomes "H", the switch 38 is conductive, and the value of the magnetic flux $\Phi$w is stored in the capacitor 39.

Therefore, the voltage waveform of the capacitor 39 becomes as shown in FIG. 5(f), and the detected magnetic flux $\Phi$ is outputted through the voltage follower 40. The detected value $\Phi$ is stored in the RAM 47 in step 114 of FIG. 4(b).

When the circuit is constructed as described above, the magnitude of the detected magnetic flux $\Phi$ is given by the following equation if the leakage inductances of the magnetic flux detecting coils 2u, 2v, 2w are ignored.

$$\Phi = \frac{1}{\sqrt{3}} K\Phi_0 \qquad (13)$$

where
K: constant determined by the gain of the circuit
$\Phi_0$: rotating magnetic flux in an air gap
On the other hand, the air gap magnetic flux $\Phi q$ of the q-axis direction is given by the following equation $$\Phi q = M(I_{q1} + I_{q2}) \qquad (14)$$

This can be modified as the following equation (15):

$$\Phi q = M\left(1 - \frac{M}{L_2}\right) I_{q1} \qquad (15)$$

Then, when the air gap magnetic flux of the d-axis direction is represented by $\Phi d$, there is the following relationship among $\Phi_0$, $\Phi d$ and $\Phi q$.

$$\Phi_0{}^2 = \Phi^2 + \Phi q^2 \qquad (16)$$

The following equation can be obtained from the equations (13), (15) and (16).

$$\Phi d = \sqrt{\frac{3}{K^2}\Phi^2 - M^2\left(1 - \frac{M}{L_2}\right)^2 I_{q1}{}^2} \qquad (17)$$

$\Phi d$ is the air gap magnetic flux of the d-axis direction, and since the secondary winding crossing magnetic flux of the q-axis direction is zero, the air gap magnetic flux $\Phi d$ is eventually equal to the secondary winding crossing magnetic flux. In step 115 of FIG. 4(b), the air gap magnetic flux $\Phi d$ of the d-axis direction is calculated on the basis of the equation (17). When the secondary winding resistance value $R_2$ stored in the ROM 46 is equal to the actual secondary winding resistance value, the air gap magnetic flux $\Phi d$ becomes coincident to the secondary winding crossing magnetic flux command value $\Phi_2*$ (which is obtained by multiplying the exciting current command value $\Phi_2*/M$ by M). In other words, when the secondary winding resistance value $R_2$ is corrected so that the air gap magnetic flux $\Phi d$ produced by the calculation of the equation (17) coincides with the secondary winding crossing magnetic flux command value $\Phi_2*$, the produced torque T becomes stable.

Then, correcting coefficient $Kc = \Phi d/\Phi_2*$ is calculated from the air gap magnetic flux $\Phi d$ and the secondary winding crossing magnetic flux command value $\Phi_2*$ in step 116 of FIG. 4(b). In step 117, a transfer function $R_2/L_2$ is corrected to $KcR_2/L_2$. Thus, as apparent from the equation (7), the slip angle frequency $\omega_s$ is corrected to the optimum value when the secondary winding resistance value is equal to the secondary winding resistance value $R_2$ stored in the ROM 46, with the result that the torque T produced as shown by the equation (11) is stabilized. Therefore, even if the temperature of the motor 2 is raised by the operation of the elevator so that the resistance value $R_2$ of the secondary winding varies, the produced torque P is stabilized, and a satisfactory operating performance of the elevator is obtained.

According to the present invention as described above, there is provided an apparatus for controlling the drive motor for an elevator by resolving the primary winding current of an induction motor into an exciting current component and a torque current component in coordinates rotating at the same angular velocity as the secondary winding crossing magnetic flux of the motor and calculating a slip angular frequency as functions of primary winding current value, secondary side winding resistance value, self-inductance and the mutual inductance value between the primary winding and the secondary winding which comprises correcting means for determining the secondary winding resistance value, thereby controlling the slip angular frequency by the corrected resistance value. Consequently, even if the temperature of the motor rises, the produced torque is stabilized, and the elevator can be operated at the predetermined speed.

What is claimed is:

1. An apparatus for controlling a power converter connected to an induction drive motor for an elevator to provide a stable torque from the motor irrespective of any change in temperature of the motor, the induction drive motor including a stator and a rotor having a primary winding and a secondary winding, the primary winding being supplied with a primary current resolved into a rotating exciting current component vector and a rotating torque current component vector rotating at the same angular velocity as a secondary winding crossing magnetic flux vector of the motor and having means for calculating a slip angular frequency as functions of primary winding current value, secondary winding resistance value, self-inductance, and the mutual inductance value between the primary winding and the secondary winding, said apparatus comprising:
    (a) magnetic flux detecting means provided in the stator of the motor for detecting magnetic flux in the stator and providing an output representing the value of the magnetic flux in the air gap between the rotor and the stator,
    (b) means operatively associated with the magnetic flux detecting means and receiving the output therefrom for determining the secondary winding resistance value corrected for change in temperature of the motor and providing the corrected value to said calculating means, and
    control means for adjusting the power converter to supply a primary winding current producing a slip angular frequency as calculated by said calculating means that provides a value of air gap magnetic flux from the output of said magnetic flux detecting means which coincides with the value of the secondary winding crossing magnetic flux component vector of the primary winding current, thereby producing a stable motor torque.

2. The apparatus as claimed in claim 1 wherein said magnetic flux detecting means comprises coils for detecting magnetic flux in the stator, and said determining means compares (1) a predetermined secondary winding crossing magnetic flux command value for said motor corresponding to a given primary winding current with (2) a value based on the output of said magnetic flux detecting means and corrects the resistance value of the secondary winding by the compared result.

3. The apparatus as claimed in claim 2 wherein the (2) value based on the output of said magnetic flux detecting means is a value of the secondary winding crossing magnetic flux calculated on the basis of the output of said magnetic flux detecting means.

4. The apparatus as claimed in claim 3 wherein the (2) value is calculated by said determining means on the basis of the output from detected magnetic flux value calculating means for calculating the detected magnetic flux value on the basis of the output of said magnetic flux detecting means.

5. The apparatus as claimed in claim 4 wherein said detected magnetic flux value calculating means calculates the magnetic flux value for controlling the power converter to control the phases of an A-C power source by integrating the output of said magnetic flux detecting means and calculates the detected magnetic flux value on the basis of the detected magnetic flux.

6. The apparatus as claimed in claim 5 wherein said determining means compares the predetermined secondary winding crossing magnetic flux command value with the output of the magnetic flux detecting means to calculate a correcting coefficient for determining the slip angular frequency, and said control means controls to correct the slip angular frequency by using the correcting coefficient.

* * * * *